June 15, 1943.  F. W. GUIBERT ET AL  2,321,743
VALVE
Original Filed Dec. 27, 1938  4 Sheets-Sheet 1
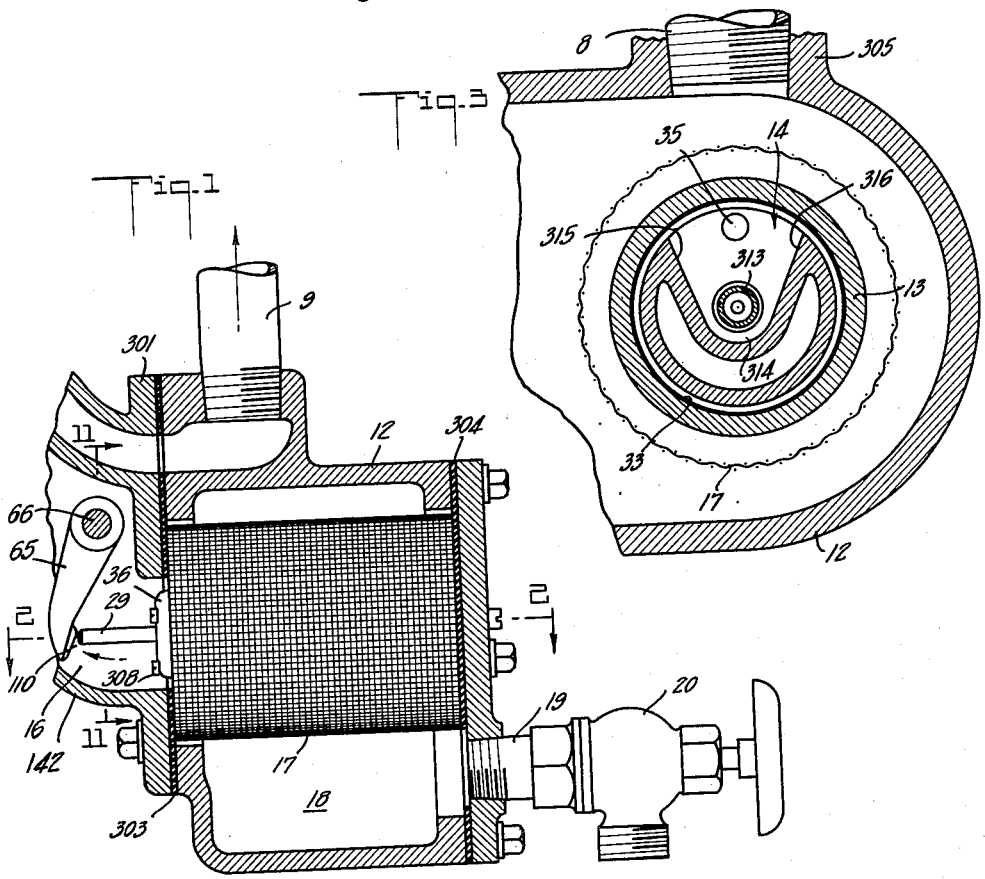
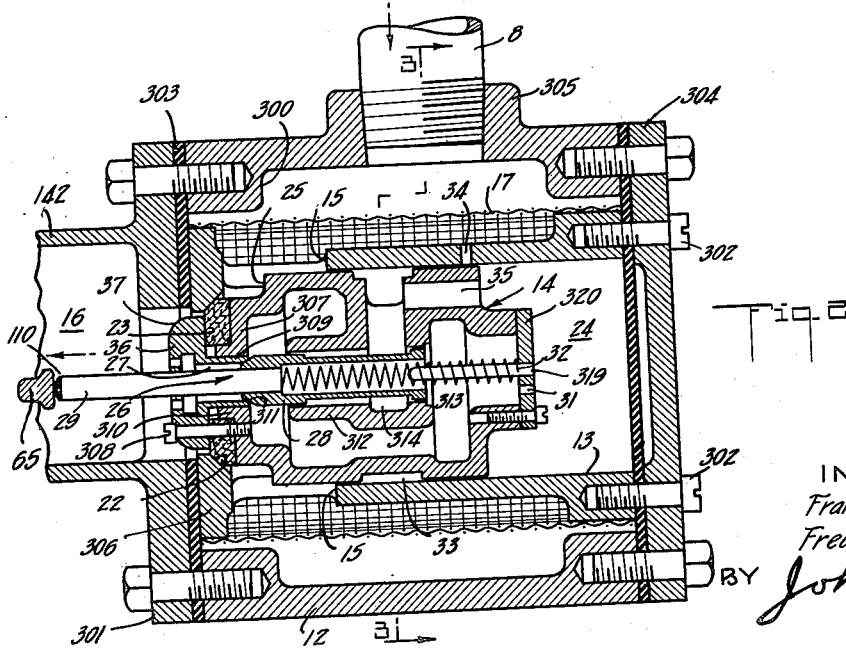
INVENTORS
Francis W. Guibert
Frederic B Fuller
BY John Flam
ATTORNEY INVENTORS
Francis W. Guibert
Frederic B. Fuller
BY John Flam
ATTORNEY

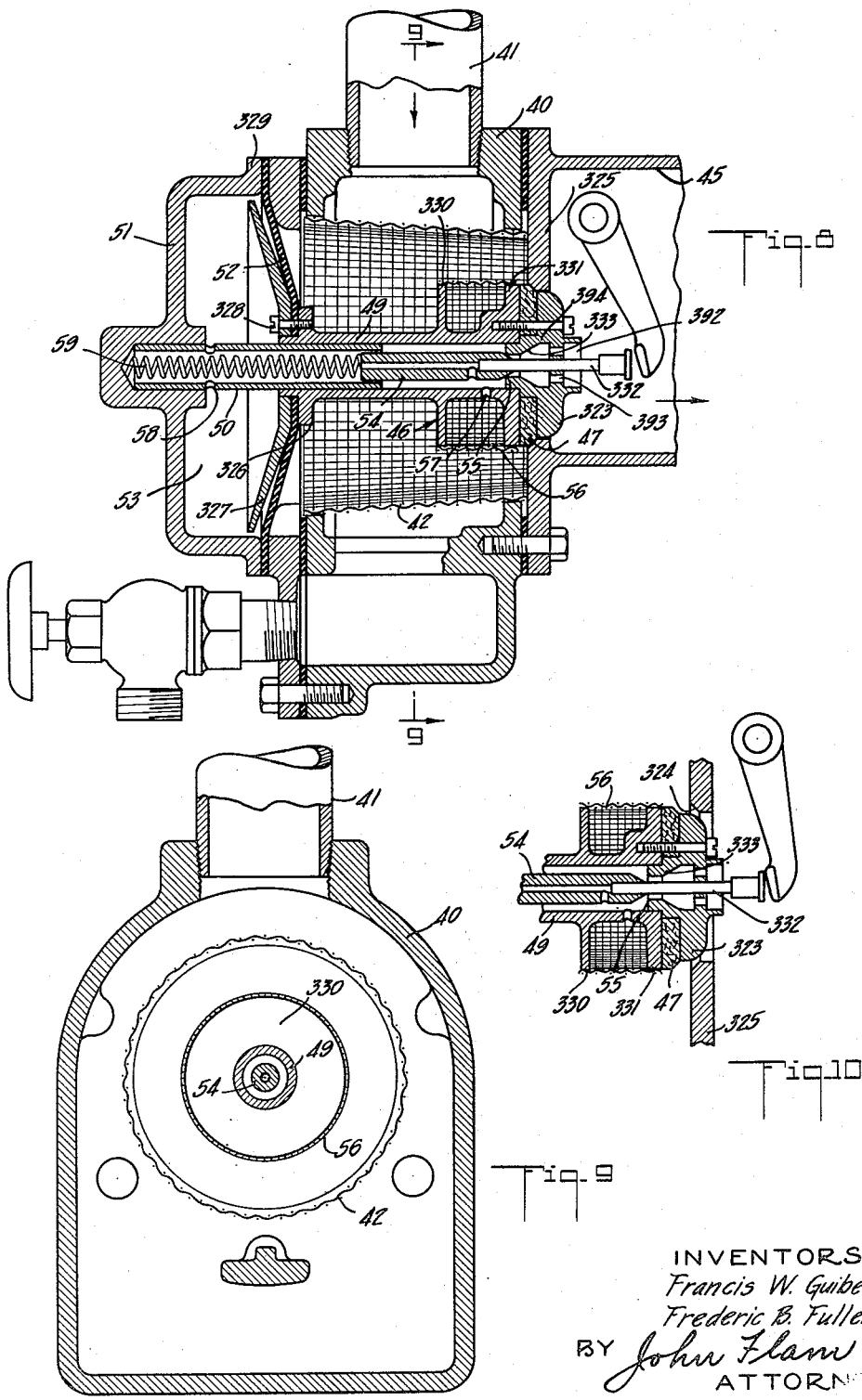

June 15, 1943.   F. W. GUIBERT ET AL   2,321,743
VALVE
Original Filed Dec. 27, 1938    4 Sheets-Sheet 4
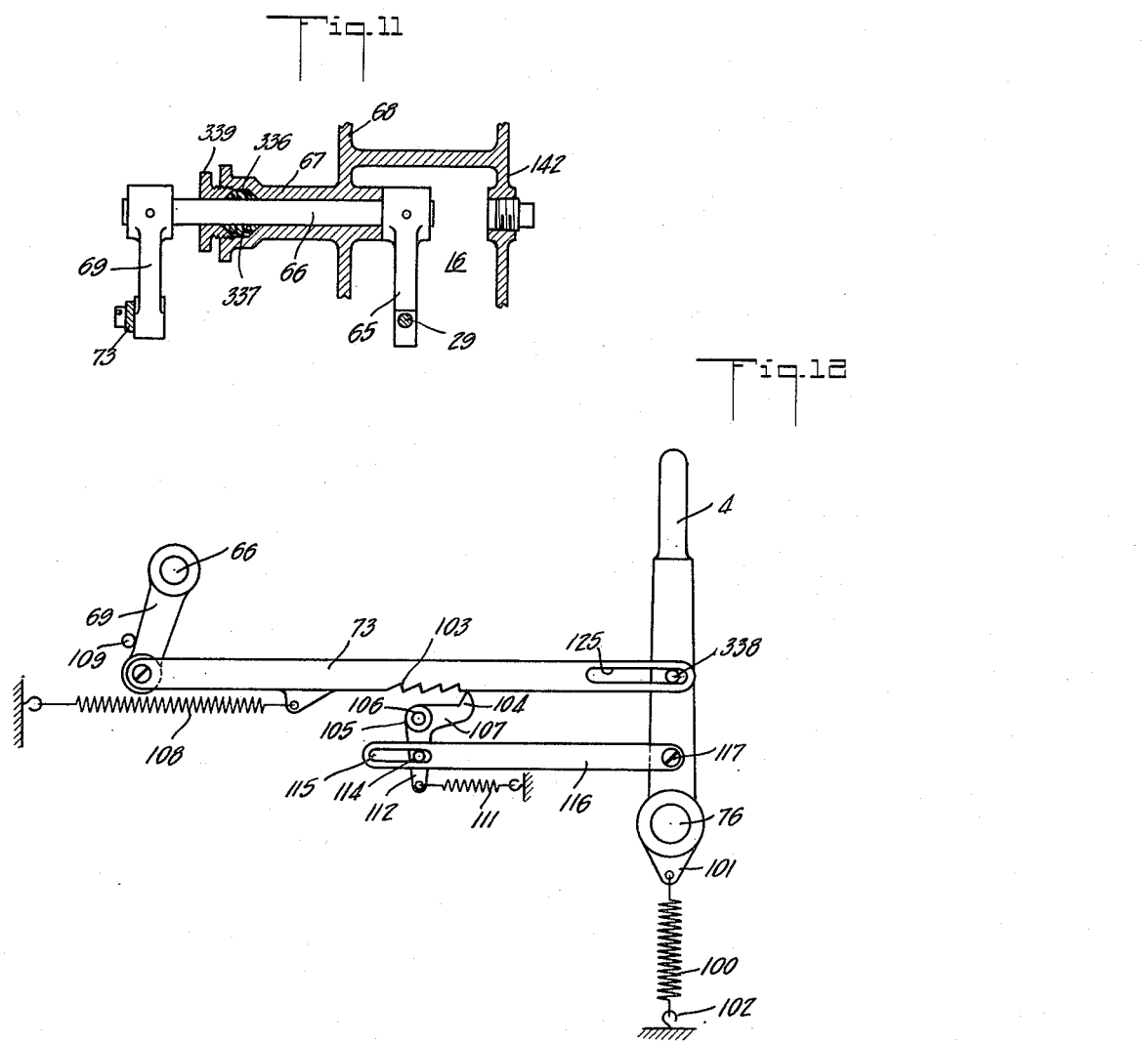
INVENTORS
Francis W. Guibert
Frederic B. Fuller
BY John Flam
ATTORNEY Patented June 15, 1943

2,321,743

UNITED STATES PATENT OFFICE 2,321,743

VALVE

Francis W. Guibert, Beverly Hills, and Frederic B. Fuller, Whittier, Calif.; said Fuller assignor to said Guibert Original application December 27, 1938, Serial No. 247,966. Divided and this application August 14, 1939, Serial No. 290,009

6 Claims. (Cl. 137—139)

This invention relates to a valve for controlling the flow of fluid, and more particularly to that type of valve known as a differential valve, in which the pressure of the controlled fluid is relied on to optionally maintain the valve in closed position, or to cause the valve to open.

This application is a division of an application filed in the name of Francis W. Guibert and Frederic B. Fuller, on December 27, 1938, under Serial Number 247,966, and entitled "Measuring device for liquids."

It is a principal object of this invention to provide a valve of this type having a pilot valve for controlling its operation carried by the main valve closure and arranged to open in the same direction as the main valve.

It is another object of this invention to provide such a valve wherein the forces acting on the pilot valve closure are balanced when this closure is unseated.

It is a further object of this invention to provide such a valve in which the position of the pilot valve closure determines the position of the main valve closure.

It is still another object of this invention to provide a differential valve in which the line pressure acts on a diaphragm for moving the main closure.

It is still a further object of this invention to provide a valve of the type described in which means are provided to prevent abrupt seating of the main closure This invention possesses many other advantages, and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the drawings:

Figure 1 is a vertical transverse section through a casing in which the valve is installed;

Fig. 2 is a horizontal section through the valve on an enlarged scale, as seen on plane 2—2 of Fig. 1;

Fig. 3 is a cross section as seen on plane 3—3 of Fig. 2;

Fig. 8 is a vertical transverse section similar to Fig. 1, but showing a modified form of valve;

Fig. 9 is a cross section as seen on plane 9—9 of Fig. 8;

Fig. 10 is a fragmentary section showing a different operating position of the valve shown in Fig. 8;

Fig. 11 is a detail section as seen on plane 11—11 of Fig. 1; and

Fig. 12 is a diagrammatic view illustrating one form of mechanism that may be used for operating the valve.

Figure 4:
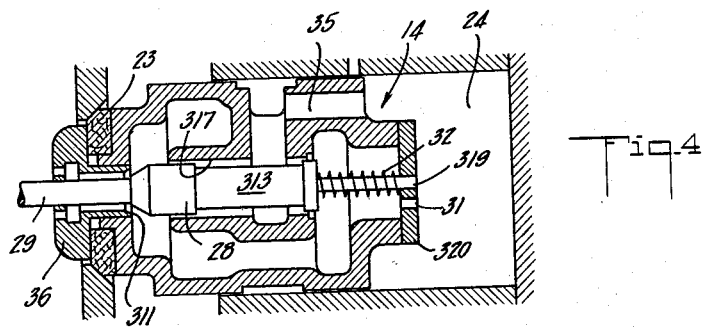
Figs. 4, 5 and 6 are fragmentary sections similar to Fig. 2, but showing various steps in the operation of the valve.

The valve is of the differential type in which a movable closure member has a large and a small area subjected to the line pressure when the member is in closed position. The pressure on the large area is effective to maintain the member in closed position. By means of an auxiliary or pilot valve, the pressure on the large area may be released, whereby the pressure on the small area is effective to move the member to open position. By mounting the pilot valve on the closure member and arranging that the pilot valve closes by movement in the same direction in which the main valve closes, it is possible accurately to control the position of the main closure by the pilot; in other words, the main closure follows the pilot valve.

Referring to the form of valve shown in Figs. 1 to 6 and particularly to Figs. 1, 2 and 3, the valve includes a body member or casing 12 which is provided at its left hand end, as shown in Fig. 3, with a series of bosses 300, by the aid of which the valve body 12 may be attached to a flange 301. This flange may be a part of a meter or other device which receives the fluid from the valve, and is shown as formed with a passage 16 which provides a discharge passage from the valve body 12. The flange 301 furthermore is arranged to form a support for the valve body. In order to provide a fluid tight connection between the flange 301 and the body 12, an appropriate sealing means or gasket 303 may be interposed between them. The opposite end of body 12 is shown as closed by a cover member 304.

The inlet conduit 8 is attached to a boss 305 formed on the casing 12. The water or other fluid passes through conduit 8 into body 12, and its further passage into extension 16 is controlled by the aid of a valve seat and closure now to be described.

As clearly shown in Figs. 2, 4, 5 and 6, a hollow member or cylinder 13 is supported within housing 12, as by machine screws 302 passing through cover 304 and engaging in tapped holes adjacent the right hand end of cylinder 13. Flange 306 at the left hand end of the cylinder 13 is maintained in fluid tight relation with flange 301 by gasket 303. Cylinder 13 has inlet ports 15 through its side walls, by means of which its interior is in communication with the interior of housing 12. A conical valve seat 22 is formed on flange 306 adjacent the discharge passage 16.

Accordingly, in order for liquid to pass into the discharge passage 16, it must first pass into cylinder 13 and thence past valve seat 22.

In order to strain the liquid as it enters cylinder 13 and to prevent the entry of foreign matter thereto, a cylindrical screen 17 of wire mesh surrounds the cylinder.

In order to make it easy to remove such foreign matter as may reach the outside of the screen 17, this matter is allowed to collect in a sump 18 (Fig. 1). The accumulated matter may be withdrawn by the opening of a tap 20 which is attached to cover 304 by a pipe extension 19.

Cooperating with the valve seat 22 is a valve closure 23, of suitable material, which may be in the form of a disk having a conical surface adapted to cooperate with the conical surface of seat 22. Disk 23 is secured on the left hand end of the main closure member 14, which member is in the form of a hollow piston adapted to slide in the interior of cylinder 13.

Disk 23, as clearly shown in Fig. 2, may be fastened to flange 307 of piston 14 by the aid of a head 36, through which the fastening screws 308 pass. These screws also pass through disk 23 and threadedly engage flange 307.

The movement of piston 14 to open and closed position is controlled by fluid pressure. Thus, the pressure of the liquid in chamber 24, defined by that part of the cylinder 13 to the right of piston 14, entering through passages to be presently described, is effective to urge piston 14 to the left toward closed position. When this pressure is released, the pressure of liquid acting on the annular surface 25 is effective to move piston 14 to the right and open the valve.

The pressure in chamber 24 may be released by the aid of a pilot valve structure 26. This, in the present instance is formed coaxially with the piston 14. For example, the head 36 may form one element of the pilot valve structure, as by having a hollow inwardly directed extension 309 forming a discharge port 27 from the inside of piston 14 through valve seat 22 into the discharge passage 16. Extension 309 closely fits within a central hollow boss 310 projecting from flange 307. This boss also serves conveniently as a centralizing guide for valve disk 23 which telescopes over it. The right hand end of extension 309 is formed with a conical pilot valve seat 311 (Figs. 4 and 6), cooperating with which is a pilot valve closure member 28 fastened to an operating stem 29. This operating stem is adapted to be controlled in a manner to be hereinafter described. It is sufficient for the present to note that the pilot valve closure 28 is guided for axial movement within the hollow piston 14, as by the aid of boss 312, integral with the piston 14. The closure member 28 has a clearance of the order of one one-hundredth of an inch within boss 312, for a purpose to be presently disclosed. It is also provided with an intermediate portion 313 of reduced diameter which projects across a space 314 transverse to the piston and formed by sloping sides 315, 316 (Fig. 3). The space 314 is in the nature of a slot extending beyond the axis of the piston 14. As clearly shown in Fig. 2, the right hand end of closure member 28 is guided in a continuation of the bore 317, in the right hand end of boss 312. A small clearance is provided between member 28 and this portion of the bore as before.

Piston 14 fits the bore of cylinder 13 with a small clearance of the order of one one-hundredth of an inch. Thus liquid from conduit 8 may enter cylinder 13 through ports 15 and leak past the piston 14 into chamber 24, from where it freely enters the interior of the piston through port 31. The liquid may also enter chamber 24 by means of slot 314 and the clearance between the closure member 28 and bore 317. This clearance and port 31 supplement each other; one or the other may be omitted.

Thus, the pressure within the piston 14 acts to urge the pilot valve closure 28 toward its seat 311 closing port 27, see Fig. 2. A light compression spring 32 is also provided to urge the pilot valve closure 28 to its seat. The pilot valve closure 28 has a hollow portion to accommodate spring 32, which is relatively long. One end of spring 32 abuts against the end of stem 29, while the other end abuts cover 320, fastened to the right hand of piston 14. A pin 319 secured in cover 320 serves to guide the spring.

The force tending to maintain the main valve closure seated substantially exceeds that tending to unseat it, as long as the pilot valve is closed. Thus, the line pressure of the fluid in chamber 24 acts on an area substantially equal to the cross section of cylinder 13, urging the piston 14 to the left. Simultaneously, the line pressure acts on the annular surface 25 and urges the piston 14 to the right. Plainly, the former force exceeds the latter force.

If now the pilot valve closure 28 is moved to the right by pressure exerted on stem 29, so that it is unseated and occupies the position of Fig. 4, the pressure in chamber 24 as well as that within piston 14 is relieved, since the effective area of the pilot outlet port 27 exceeds the area of the passage through which the liquid urged by the line pressure enters chamber 24. This passage is the previously mentioned clearance between the piston 14 and cylinder 13. The force of the line pressure acting on annular surface 25 and urging piston 14 to the right is now greater than that opposing it. Thus the piston 14 moves to the right and opens the main valve.

However, this movement of the piston to the right only continues until the pilot seat 311 has approached the pilot valve closure 28 to such a point that the volume of discharge through port 27 equals the intake into chamber 24 and the interior of piston 14. Then a condition of equilibrium is established and the piston 14 remains stationary.

Figure 5:
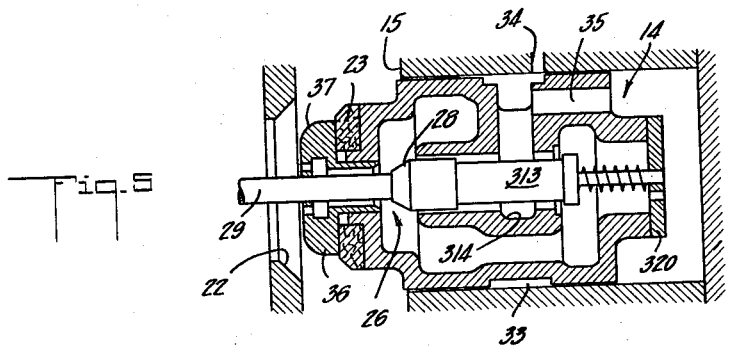

If the main valve is to be fully opened, the pilot valve closure 28 is moved far enough to the right to ensure that piston 14 will move far enough to the right to give the desired opening before this point of equilibrium is reached (Fig. 5).

When the valve is to be closed, the pilot valve closure 28 is allowed to move toward its seat 311 in response to spring 32, thus reducing the discharge area of port 27. When the rate of discharge through port 27 falls below the rate at which liquid is passing into chamber 24 and the inside of piston 14, pressure builds up to the right of the piston and urges the piston toward the left. If the movement of closure 28 is checked, the piston 14 will move until the flow into chamber 24 and the piston and the flow out past the pilot valve are equal, when the piston will stop, the same as in opening the valve. If the valve is to be entirely closed, the pilot valve closure 28 is allowed to remain seated in response to the pressure of spring 32, which permits pressure built up to the right of the piston to move it to the left until the main valve is seated.

Figure 6:
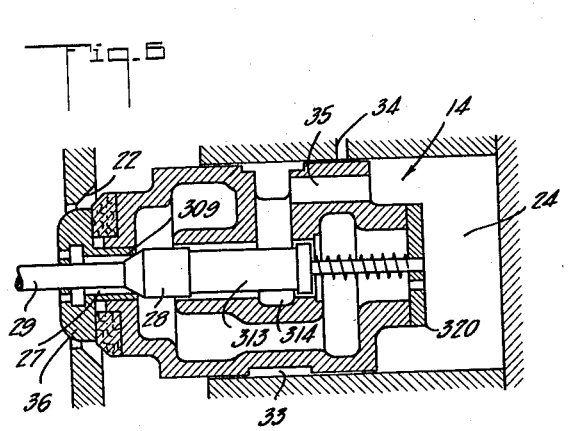

It is noted that the liquid which enters chamber 24 from conduit 8 proceeds through the slight clearance between piston 14 and the valve member 13. Thus it may take an appreciable time for pressure to be built up in the chamber 24, and the valve would therefore close slowly. While this slow closing movement is desirable at the end of the closing cycle to prevent water hammer, provisions are present for the exertion of sufficient fluid pressure at the beginning of the closing movement to start the motion of the piston 14. For this purpose, as shown most clearly in Fig. 5, the line liquid can pass into piston 14 not only through the restricted passages, but also through the large clearance around the reduced portion 313 of the pilot valve closure member 28 where this portion extends beyond the right hand end of bore 311. The liquid flow during the early part of the valve closing movement to the chamber 24 is further increased by additional provisions. Thus there is an annular groove 33 formed on the exterior of the piston 14 (Figs. 4, 5 and 6). The port 34 in the valve member or cylinder 13, as shown most clearly in Fig. 5, is in registry with this groove when the valve is fully opened, but not otherwise. When the valve is thus fully opened, liquid can enter rapidly through the port 34 into the slot 314 and through the port 35 into chamber 24. Therefore from the fully open position shown in Fig. 5, the valve starts to close at a rapid rate. When the valve is partly closed, as shown in Fig. 6, the piston 14 overlies the port 34 so that the passage of liquid into the chamber 24 is restricted to the clearance between the piston 14 and the member 13. Accordingly the closing from then on proceeds at a slower rate.

The pilot valve structure including the seat 311 and the closure 28 is in balance at all times except when the valve is closed. When this occurs, the line pressure in chamber 24 acting on the end of member 28, as well as on the surface of the inside end of the hollow extension 313 holds the closure 28 to its seat with considerable force. A manual force by appropriate levers and links is used to unseat it. As soon as it is unseated, equilibrium exists and only a slight force is required to cause the piston 14 to move in one direction or the other. This movement of the pilot valve is accomplished by operation of the stem 29 operated in turn by appropriate control mechanism. The spring 32 is very light and only strong enough to seat the pilot valve closure 28 when the force exerted on the stem 29 is released.

Figure 7:
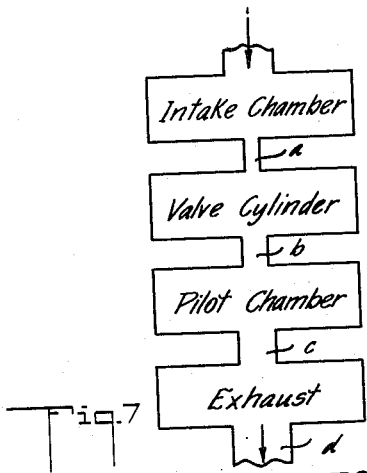
Fig. 7 is a diagram illustrating the principle of operation of the valve.

In Fig. 7 the valve operation is illustrated diagrammatically. The opening $a$ from the intake chamber formed in the body 12 permits liquid to enter the main valve cylinder 13 and seat the main valve. The opening $b$ from the cylinder 13 into the pilot chamber formed in the hollow part of the piston 14 permits the liquid to enter and seat the pilot valve. The opening $c$ extends from the pilot chamber to the discharge passage. The exhaust opening $d$ diagrammatizes the discharge passageway 16. To release the pressure from the chamber 24, it must be possible to make opening $c$ exceed opening $b$. The control of these openings, as hereinbefore described, is rendered possible by operation of pilot valve stem 29.

By referring to Figs. 2, 4, 5 and 6, it will be noted that the head 36 which serves to fasten the main valve disk 23 to piston 14 is beveled or curved around the exposed edge of its periphery, as indicated by 37. Therefore, as the valve closure disk 23 approaches closed position, the effective area of the discharge port is decreased in a gradual manner by the coaction between the level 37 and said seat 22; instead of a sudden closure that would otherwise occur. As the valve approaches closed position, the pressure built up behind it increases, and consequently the closing of the valve is accelerated. The head 36 in effect operates in the nature of a hydraulic cam, so shaped as to prevent water hammer that would occur on too sudden closing. This is accomplished by increasingly restricting the discharge opening as the valve approaches closed position. This graduates the closure over a larger axial movement of the valve. If no cam was used, the valve would have to be moved very slowly near its closed position to avoid water hammer.

Another such form of valve is illustrated in Figs. 8, 9 and 10. In this form of the valve, the inlet conduit 41 is shown as threaded into a valve body 40. There is a straining screen 42 disposed within the body 40 and surrounding a space in which a main valve structure is located; this valve structure includes an axially movable structure 46. This structure carries a valve closure 47. This valve closure is supported on a hollow valve stem 49, as by the aid of the head 323, which cooperates with the flange 331 on stem 49, to confine the valve disc 47. The closure 47 cooperates with conical valve seat 324 (Fig. 10) formed in the wall 325 of the outlet extension 45.

Valve stem 49 is slidably supported on a stationary tube 50 fixed to cover 51, which is provided with a flange 329. Suitable screws or bolts not shown serve to secure this flange to body 40. A flexible diaphragm 52, of rubber or other suitable material, is clamped at its outer edge between flange 329 and body 40, forming a chamber 53. The diaphragm 52 is provided with a central aperture through which the left hand end of stem 49 projects. The flange 326 formed on stem 49 abuts the right hand surface of the diaphragm 52. A plate 327 disposed on the left hand side of the diaphragm is secured to flange 326 by screws 328, the diaphragm 52 being attached in sealing relation to the stem 49 in this manner.

This is also a differential type valve; if the pressure in chamber 53, on one side of diaphragm 52 equals that in housing 40, on the other side of the diaphragm, the valve will be urged to the right toward its seat by the pressure in body 40 acting on flange 331. If the pressure in chamber 53 is released, then the pressure in the body acting on the right side of diaphragm 52 will exceed the pressure acting on flange 331, since the former has a greater area, and the valve will move to the left, to open position.

Fluid pressure may pass from the interior of body 40 to chamber 53, through various ports and openings, as will now be described. As in the first form described, use is made of a coaxially arranged pilot valve structure for controlling the liquid pressure in chamber 53. The pilot valve structure includes a stem 332 carrying the hollow pilot valve closure member 54. A compression spring 59 within tube 50 abuts the left hand end of member 54, in order to urge the member to the closed position of Fig. 8. Since the left hand end of spring 59 abuts head 51, and since the pilot valve seat 55 is carried by the main valve closure, spring 59, by urging the pilot closure member 54 to its seat, urges the main valve closure toward its seat as well. The pilot valve closure 54 cooperates with a pilot valve seat 55, shown as formed integral with a hollow extension 333 of head 323.

Liquid may pass through port 57 into stem 49 and thence through the hollow valve closure into tube 50. Ports 58 in tube 50 permit the liquid to pass into chamber 53. Before entering port 57, liquid must pass through a fine mesh cylindrical screen 56 carried by flanges 330 and 331 which are integral with stem 49. Thus, the pressure of liquid in chambers 40 and 53 acts on the left hand surface of the valve closure member 54 and stem 332 to urge the closure member toward its seat.

The net area of the pilot discharge port through seat 55, when the pilot valve is fully open, is greater than the area of port 57. Thus, when the pilot valve is unseated by pressure acting to the left exerted on stem 332, all liquid entering stem 49 through port 57 can pass into the discharge connection 45, as well as some liquid from chamber 53; thus all pressure in chamber 53 is released. The pressure in body 40 acting on the opposite side of the diaphragm 52 can now act to move the diaphragm to the left, thus opening the main valve. This movement continues until an equilibrium position is reached, which occurs when the pressures on opposite sides of the diaphragm 52 are substantially equal. Since the pilot valve seat 55 is carried by the main valve, this equalization occurs when the movement of the main valve has adjusted the position of the pilot valve seat 55 with respect to the pilot valve closure 54, so that the discharge area through the seat permits liquid to discharge at the same rate as it enters through port 57.

A full opening of the main valve may be obtained by holding the pilot valve closure 54 sufficiently far to the left so that the main valve may move far enough to the left to give full opening before the above described equalization of pressure occurs. To move the main valve toward closed position, the force urging stem 332 to the left is released which allows spring 59 to move pilot valve closure 54 toward seat 55. This allows pressure in chamber 53 to equalize with that in body 40. Thereupon, the velocity of the liquid discharging through the main valve seat acting on flanges 330 and 331 is effective to move the main valve toward closed position. This movement moves the pilot valve seat 55 away from closure 54 until the pressure in chamber 53 is reduced sufficiently to overcome this velocity head which establishes a condition of equilibrium, as before. Upon entirely releasing stem 332 so that the pilot may remain seated in response to the pressure of spring 59, the pressure builds up in chamber 53 to equalize that in body 40, and the velocity head together with the spring pressure are effective to seat the main valve. At some point in the closing of the main valve, the pressure in body 40 will begin substantially to exceed that in discharge passage 45. At such time, the pressure differential on the opposite sides of flange 331 are effective to seat the valve.

By reference to Figs. 8 and 10 it will be noted that head 323 is formed with its outer periphery arranged to progressively restrict the opening through valve seat 324 as the valve nears its seating position. Its action and purpose are the same as those of head 36 in the first described form of valve.

To ensure full opening of the main valve, means are provided to assist the discharge of liquid through the pilot valve seat 55, by providing a slight suction or ejector action. Thus, head 323 has a short skirt or tubular extension 392, which may be integral with the head. The outer surface of this skirt is curved to provide a smoothly streamlined continuation of the exterior surface of the head. The inside of the skirt is in communication with the opening through seat 55 by ports 393 formed in wall 394, which wall is to support the pilot valve stem 332. This skirt may be said to form an eduction tube.

The water passing through the main valve seat passes the skirt, causing a suction or reduction of pressure within by its ejector action. This assists the passage of water through the pilot valve from the interior of the valve body, ensuring full opening of the valve.

A similar skirt can be applied to head 36, of the first disclosed type of valve for a similar purpose, if desired.

In both types of valves described, it is possible to maintain the pilot valve stem 29 or 332 in an intermediate position to permit the valve to discharge at a dribbling rate.

The control of the pilot valve stem 29 or 332 to urge the pilot valve to opening position may be accomplished by the aid of a hand lever 4, illustrated in Fig. 12. As shown in Fig. 1, the pilot valve stem 29 extends into the passageway 16 and its left hand end is shown as engageable by the operating end of a rocking arm 65. This arm 65 is shown as mounted on a shaft 66 (Fig. 11) which extends outside of the casing 142 which defines the passageway 16.

Any suitable arrangement may be provided to prevent escape of fluid from passageway 16 along shaft 66. Thus, wall 68 has a sleeve or boss 67 through which the shaft 66 extends, and which is provided with a stuffing box 336 at its outer end for the reception of packing 337. Packing 337 is shown as tightened against shaft 66 by the aid of a gland 339, threadedly mounted in stuffing box 336.

The outer end of the shaft 66 carries an operating lever 69 (Figs. 11 and 12) to the free end of which is pivotally secured one end of a connecting link 73. The other end of link 73 is provided with a slot 125 in which a pin 338 is accommodated. Pin 338 is secured to the hand lever 4. Link 73 and arm 69 are urged to the left by a tension spring 108, a suitable stop 109 being provided to limit this leftward movement. The arrangement is such that with arm 69 against stop 109, a small clearance 110 (Figs. 1 and 2) remains between arm 65 and pilot valve stem 29, when both the pilot valve 26 and the main closure member 14 are seated. In this way proper seating of the pilot valve 26 and member 14 is assured.

Hand lever 4 is pivotally supported at its lower end, as by a stub shaft 76, and is maintained in a normally vertical position in any convenient manner. For example, a tension spring 100 may be stretched between a downwardly extending ear 101 on lever 4 and a stationary hook 102. Obviously, any movement of lever 4 from the vertical will cause a lengthening of spring 100 and will be opposed by the tension of the spring.

Movement of arm 4 to the right, as viewed in Fig. 12, will first take up the lost motion between pin 338 and the ends of slot 125, after which link 73 will be pulled to the right against the tension of spring 108, swinging arm 69 in a counterclockwise direction away from stop 109. This movement of arm 69 causes a corresponding movement of arm 65 (Figs. 1 and 11) which in turn causes the pilot valve 26 to be urged toward opening position. Thus, the extent of the movement of arm 4 controls the extent of the opening of the main valve closure 14.

Stop means are provided to hold the arm 69 in position to maintain the pilot valve 26, and thus the main valve, open after operating handle 4 has been released and allowed to return to its normal position. Thus, link 73 may have a number of ratchet teeth 103 formed thereon and arranged to be engaged by a dog 104 carried by a latch or detent 105. Latch 105 may be in the form of a bell crank pivotally supported at 106. Dog 104 is carried at the extremity of one of the arms 107 of the bell crank, while a tension spring 111 secured to the other arm 112 served to urge dog 104 into engagement with the teeth 103. The farthest left of teeth 103 when engaged by dog 104 will act to hold link 73 and arm 69 in their most advanced position to the right, corresponding to full open position of pilot valve 26, as well as the main closure 14. The other teeth are provided to hold arm 69 and link 73 in intermediate positions giving progressively smaller valve openings corresponding to the extent of the movement of lever 4 to the right. Slot 125 permits lever 4 to return to the vertical in response to the action of spring 100 when link 73 is latched at any point.

Provision is made for releasing the dog 104 from teeth 103, by a counterclockwise movement of lever 4. Thus, for example a pin 114 may be secured to arm 112 of bell crank 105. This pin 114 engages a slot 115 formed in one end of a link 116, the other end of link 116 being pinned to lever 4 at 117. By means of this connection, movement of the operating lever 4 to the left will cause first the right hand end of slot 115 to engage pin 114 and then cause bell crank 105 to swing clockwise about its pivot 106 and against the tension of spring 111. This movement swings dog 104 out of engagement with ratchet teeth 103 permitting link 73 and arm 69 to swing to the left until arm 69 engages stop 109. This permits the pilot valve 26 as well as closure member 14 to seat and close the valve completely. It is to be noted that slot 125 is of sufficient length to permit lever 4 to be swung freely to the left to disengage latch 104 at all times, even when link 73 is latched in position corresponding to a fully opened valve. Also slot 115 extends sufficiently far to the left of pin 114 to permit lever 4 to swing freely to the right to impart the maximum required movement to link 73.

What is claimed is:

1. In a device of the character described, a valve cylinder having a valve seat, and a piston closure member guided in said cylinder and cooperating with said seat, said cylinder having a port communicating with a small clearance space around the piston to cause fluid under pressure to pass to one side of the piston for urging it to closing position, said piston being so formed that when the valve is fully open, fluid may pass freely through said port to the said one side for initiating the closing movement, and means for reducing the fluid pressure to cause the valve to open.

2. In a device of the character described, a valve cylinder having a valve seat, a piston closure member guided in said cylinder and cooperating with said seat, said cylinder having a port communicating with a small clearance space around the piston to cause fluid under pressure to pass to one side of the piston for urging it to closing position, said piston being so formed that when the valve is fully open, fluid may pass freely to the said one side for initiating the closing movement, and means for reducing the fluid pressure to cause the valve to open, comprising a pilot valve closure cooperating with a port in the piston valve closure, and slidably supported in the piston valve closure.

3. In a device of the character described, a valve cylinder having a valve seat, a piston closure member guided in said cylinder and cooperating with said seat, said cylinder having a port communicating with a small clearance space around the piston to cause fluid under pressure to pass to one side of the piston for urging it to closing position, said piston being so formed that when the valve is fully open, fluid may pass freely to the said one side for initiating the closing movement, and means for reducing the fluid pressure to cause the valve to open, comprising a pilot valve closure cooperating with a port in the piston valve closure, and slidably supported in the piston valve closure, said pilot valve closure being urged by fluid pressure toward closing position only while said pilot valve closure contacts said seat.

4. In a valve, a housing including a side wall, means forming a sump in the lower portion of the housing, and an end wall, there being an inlet in the side wall and an outlet in the end wall intermediate the side wall and the sump, means forming a valve seat about the outlet, a closure member in the housing adapted to cooperate with said seat, means for optionally causing said member to move toward or away from said seat, an annular screen surrounding said closure member so as to be interposed between the inlet and the outlet, and means to drain the sump.

5. In a valve, a housing including a side wall, means forming a sump in the lower portion of the housing, and an end wall, there being an inlet in the side wall and an outlet in the end wall intermediate the side wall and the sump, means formed in the housing for slidably supporting said valve and guiding it for axial movement with respect to said seat, means for optionally causing said member to move toward or away from said seat, an annular screen surrounding said closure member and said supporting means so as to be interposed between the inlet and the outlet, and means to drain the sump.

6. In a valve, a housing including a side wall, means forming a sump in the lower portion of the housing, and an end wall, there being an inlet in the side wall and an outlet in the end wall intermediate the side wall and the sump, a valve cylinder supported in the housing and having means forming a valve seat about said outlet, said cylinder and said seat being coaxial, said cylinder having an opening to admit liquid from the housing, a closure member slidably supported by the wall of said cylinder for cooperation with the valve seat, means for optionally causing said member to move toward or away from said seat, an annular screen surrounding said cylinder so as to be interposed in the passage of liquid from the inlet to the outlet, and means to drain the sump.

FRANCIS W. GUIBERT.
FREDERIC B. FULLER.